United States Patent
Brisebois et al.

(10) Patent No.: US 8,521,169 B2
(45) Date of Patent: *Aug. 27, 2013

(54) FEMTO JAMMING OF MACRO PILOT

(75) Inventors: Arthur Brisebois, Cumming, GA (US);
Giuseppe De Rosa, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/601,334

(22) Filed: Aug. 31, 2012

(65) Prior Publication Data

US 2012/0329382 A1    Dec. 27, 2012

Related U.S. Application Data

(63) Continuation of application No. 12/603,179, filed on Oct. 21, 2009, now Pat. No. 8,280,383.

(51) Int. Cl.
*H04W 36/00* (2009.01)
(52) U.S. Cl.
USPC ............................ 455/444; 455/443; 455/454
(58) Field of Classification Search
USPC ................... 455/424, 426.1, 435.2, 436, 442, 455/443, 444, 449, 450, 454; 370/328
See application file for complete search history.

(56) References Cited

U.S. PATENT DOCUMENTS

| 5,771,454 | A  | * | 6/1998  | Ohsawa .................... 455/452.2 |
| 7,477,920 | B2 | * | 1/2009  | Scheinert et al. ............. 455/561 |
| 8,072,914 | B2 |   | 12/2011 | Brisebois et al. |
| 8,135,403 | B1 |   | 3/2012  | Oh et al. |
| 8,311,005 | B2 | * | 11/2012 | Sundaresan et al. .......... 370/329 |
| 8,335,181 | B2 | * | 12/2012 | Jung et al. ...................... 370/328 |
| 2002/0128014 | A1 | * | 9/2002 | Chen .............................. 455/447 |
| 2004/0005897 | A1 | * | 1/2004 | Tomoe et al. .................. 455/450 |
| 2008/0244148 | A1 |   | 10/2008 | Nix et al. |
| 2009/0080375 | A1 | * | 3/2009 | Jalil et al. ....................... 370/329 |
| 2010/0008294 | A1 | * | 1/2010 | Palanki et al. ................. 370/328 |
| 2010/0054308 | A1 |   | 3/2010 | Brisebois et al. |
| 2010/0085913 | A1 | * | 4/2010 | Subrahmanya ............... 370/328 |
| 2010/0099431 | A1 |   | 4/2010 | Sampath et al. |
| 2010/0165942 | A1 | * | 7/2010 | Liao et al. ...................... 370/329 |
| 2011/0003597 | A1 |   | 1/2011 | Budic et al. |
| 2011/0013600 | A1 |   | 1/2011 | Kim et al. |
| 2011/0047029 | A1 | * | 2/2011 | Nair et al. ................... 705/14.52 |
| 2011/0212731 | A1 | * | 9/2011 | Lee et al. ....................... 455/450 |
| 2012/0020293 | A1 | * | 1/2012 | Nix et al. ....................... 370/328 |

OTHER PUBLICATIONS

Notice of Allowance dated Jun. 25, 2012 for U.S. Appl. No. 12/603,179, 26 pages.

* cited by examiner

*Primary Examiner* — Dominic E Rego
(74) *Attorney, Agent, or Firm* — Turocy & Watson, LLP

(57) ABSTRACT

A system and methodology that facilitates triggering device scanning and efficient femtocell detection in areas dominated by macro cells is provided. In particular, the system can includes a jamming component that generates a small and measured amount of interference to user equipment or user equipments (UEs) camping on nearby macro carriers. Moreover, the power utilized to introduce the interference can be enough to cause macro signal quality around the femtocell access point (AP) to fall below a scan trigger level. The UE(s) can detect the macro signal quality decline below the scan trigger level and scan other frequency bands, including the femtocell, on which to camp. Additionally, the system can perform femto pilot gating, such that the jamming component can scan the radio environment surrounding the femto AP during an off state, to determine information that facilitates jamming of a macro pilot.

20 Claims, 13 Drawing Sheets

FEMTO JAMMING OF MACRO PILOT

CROSS-REFERENCE TO RELATED APPLICATIONS

This application is a continuation of U.S. application Ser. No. 12/603,179 filed on Oct. 21, 2009, entitled "FEMTO JAMMING OF MACRO PILOT." The entirety of this application is incorporated herein by reference

TECHNICAL FIELD

The subject disclosure relates to wireless communications and, more particularly, to a mechanism that facilitates quality-based handset scanning in areas where macro cell coverage is sufficiently strong for communication.

BACKGROUND

Femtocells—building-based wireless access points interfaced with a wired broadband network—are traditionally deployed to improve indoor wireless coverage, and to offload a mobility radio access network (RAN) operated by a wireless service provider. Improved indoor coverage includes stronger signal and improved reception (e.g., voice, sound, or data), ease of session or call initiation, and session or call retention as well. Offloading a RAN reduces operational and transport costs for the service provider since a lesser number of end users utilizes over-the-air radio resources (e.g., radio frequency channels), which are typically limited. With the rapid increase in utilization of communications networks and/or devices, mobile data communications have been continually evolving due to increasing requirements of workforce mobility, and, services provided by femtocells can be extended beyond indoor coverage enhancement; for example, femtocells can be utilized in areas wherein macro coverage is not poor or weak.

Typically, femto and macro networks utilize different frequency bands. Moreover, user equipment (UE), such as Universal Mobile Telecommunications System (UMTS) handsets, can access a macro network and scan for a different carrier when the signal strength of the macro network degrades below a specific threshold. However, conventional UEs do not scan other frequency bands when radio conditions are ideal and/or the received signal strength from the macro network is strong, for example, above the specific threshold. In this manner, the UEs can save battery resources that would otherwise be wasted by continuous and/or periodic scanning.

During this traditional approach, the UEs fail to detect or access femto networks placed within ideal/strong macro coverage areas, leading to under-utilization of the femto networks. Thus, the femto networks are unable to deliver the anticipated customer and service provider benefits to the UEs. Moreover, the inability to detect and/or access a femtocell, when the macro cell signal strength environment received at a UE is strong, can negatively impact performance and customer satisfaction.

DETAILED DESCRIPTION

Figure 1:
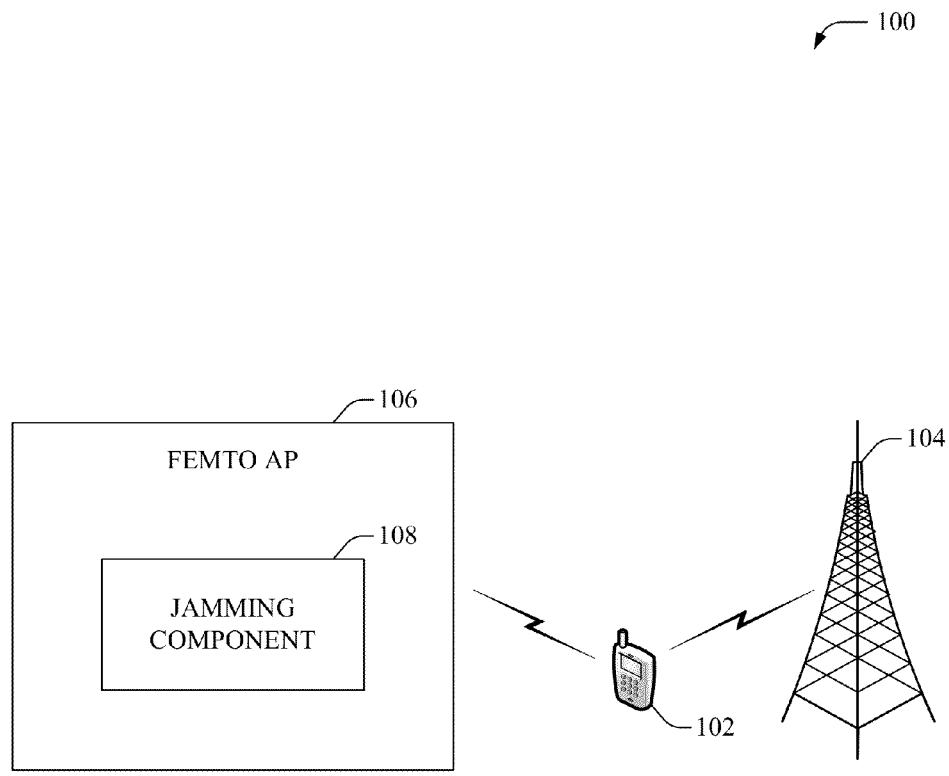
FIG. 1 illustrates an example system that facilitates utilization of a femto network, by a user equipment (UE), when a macro network signal quality received at the UE is strong.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "platform," "service," "framework," "connector," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the various embodiments.

In addition, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," "access terminal," "terminal," "handset," "mobile device," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. Additionally, the terms "femtocell network", and "femto network" are utilized interchangeably, while "macro cell network" and "macro network" are utilized interchangeably herein.

Furthermore, the terms "user," "subscriber," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth. In addition, the terms "femtocell access point", "femtocell" and "femto access point" are also utilized interchangeably.

Traditional femtocells are mainly deployed to improve coverage, for example, inside a home, office, hotel, etc. where poor macro service quality is experienced. An ideal macro coverage problem has therefore not been observed. However, with the rapid growth in femtocell development, femtocells will be deployed not only in areas with poor macro coverage, but also in areas that have ideal macro coverage. In this scenario, a user equipment (UE) within the femto coverage area will not detect and/or access the femto network due to the ideal macro conditions and thus the femtocell will be unable to provide the UE with anticipated customer and service provider benefits.

The systems and methods disclosed herein, in one aspect thereof, can facilitate efficient utilization of a femto network, by a user equipment (UE), when a macro network signal quality received at the UE is strong and/or satisfactory. According to one aspect, a femto access point (AP) can include a jamming component, which can be employed to introduce conditions that facilitate triggering a carrier frequency scan by the UE. The carrier frequency scan can facilitate detection of the femtocell by the by UE. Specifically, the jamming component can scan a radio environment near the femto AP, for example, upon power-up, periodically, and/or on demand, to identify one or more macro network carriers that provide UEs with ideal radio conditions for communication. Based in part on a determined macro carrier signal strength of the one or more macro carriers, the jamming component can determine a measured amount of interference that can trigger the carrier frequency scan at the UEs. In one aspect, the jamming component facilitates transmission of the interference at regular intervals, such that, the interference can cause macro signal quality to decline below a scan level threshold and the UE can perform the carrier frequency scan. The carrier frequency scan can facilitate detection of the femto network and the UE can communicate with the femto AP for attachment.

In accordance with another aspect, a transmission component can be employed that can facilitate femto pilot gating. Moreover, the transmission component can enable a pilot signal transmitter at the femtocell to alternate between high power and off states, according to a defined duty cycle, sequence and/or pattern. In one aspect, a radio environment detection component can scan the radio environment surrounding the femto AP during the off state, to facilitate interference measurements and/or generate an optimal interference value.

Yet another aspect of the disclosed subject matter relates to a method that can be employed to facilitate jamming of a strong macro carrier signal. Specifically, the method comprises determining that a femto AP is idle and performing jamming of a macro carrier signal that surrounds the femtocell, when the femto AP is idle. In one aspect, the jamming includes identifying a strong macro carrier signal and introducing a small and measured amount of interference, in a manner such that, the macro carrier signal quality declines enough to trigger a carrier frequency scan at a UE, attached to the macro network, without degrading or killing communications between the UE and the macro network. Additionally, the method comprises performing femto pilot gating by alternating between a high power and an off state during transmission. Further, radio conditions, for example, surrounding the femto AP, can be scanned during the off state of the transmissions to identify one or more strong macro carriers and calculate interference data.

The systems and methods disclosed herein facilitate generation of interference, by a femto access point (AP), to the nearby UEs camping on macro carriers, when macro signal quality received at the UEs is ideal. Moreover, the interference can cause macro signal quality to decline around the immediate vicinity of the femtocell access point (AP).

Accordingly, nearby UEs can detect the macro signal quality decline, and, scan and/or detect other frequency bands, including the femtocell.

Aspects, features, or advantages of the subject innovation can be exploited in substantially any wireless communication technology; e.g., Wi-Fi, Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), or Zigbee. Additionally, substantially all aspects of the subject innovation can be exploited in legacy telecommunication technologies.

Referring initially to FIG. 1, there illustrated is an example system 100 that facilitates utilization of a femto network, by a user equipment (UE) 102, when a macro network signal quality received at the UE is strong, according to an aspect of the subject innovation. Typically, the UE 102 as disclosed herein can include most any communication device employed by a subscriber, such as, but not limited to, a cellular phone, a personal digital assistant (PDA), a laptop, a personal computer, a media player, a gaming console, and the like. Moreover, the UE 102 can access a macro network via base station 104. It can be appreciated that the macro network can include most any radio environment, such as, but not limited to, Universal Mobile Telecommunications System (UMTS), Global System for Mobile communications (GSM), LTE, WiFi, WiMAX, CDMA, etc. The signaling and bearer technologies, for example circuit switched (CS), and/or packet switched (PS), in a femtocell and macro cell can be the same or different, depending on the radio technologies involved.

System 100 can further include a femtocell, served by a femto access point (AP) 106. The femtocell can cover an area that can be determined, at least in part, by transmission power allocated to femto AP 106, path loss, shadowing, and so forth. According to one aspect, the femto AP 106 can include a jamming component 108 that can be employed to facilitate detection of the femtocell by the UE 102. Typically, UE 102, for example, communicating with base station 104, can scan carrier frequencies when the observed macro signal quality falls below a specified threshold. However, when macro signal quality is greater or equal to the specified threshold, the UE 102 does not scan for alternate carriers in order to conserve battery life, and thus fails to detect femto AP 106, even when the UE 102 is within the femto coverage area.

In one embodiment, the jamming component 108 can be utilized to detect the presence of a nearby UE 102, for example, within the femto coverage area and determine the macro carrier signal strength between base station 104 and UE 102. Based in part on the determined macro carrier signal strength, the jamming component 108 can generate a measured amount of interference. In one aspect, the jamming component 108 can facilitate transmission of the interference at regular intervals, such that, the interference can cause macro signal quality to be less than ideal (e.g., the specified threshold) within the femto coverage area. Accordingly, UE 102 can detect the macro signal quality decline and trigger a carrier frequency scan. The carrier frequency scan can facilitate detection of the femto network and the UE 102 can communicate with the femto AP 106 for attachment. It can be appreciated that the interference generated by the jamming component 108 can be a minimum amount, such that macro signal quality falls below the specified threshold without degrading or killing macro calls.

Figure 2:
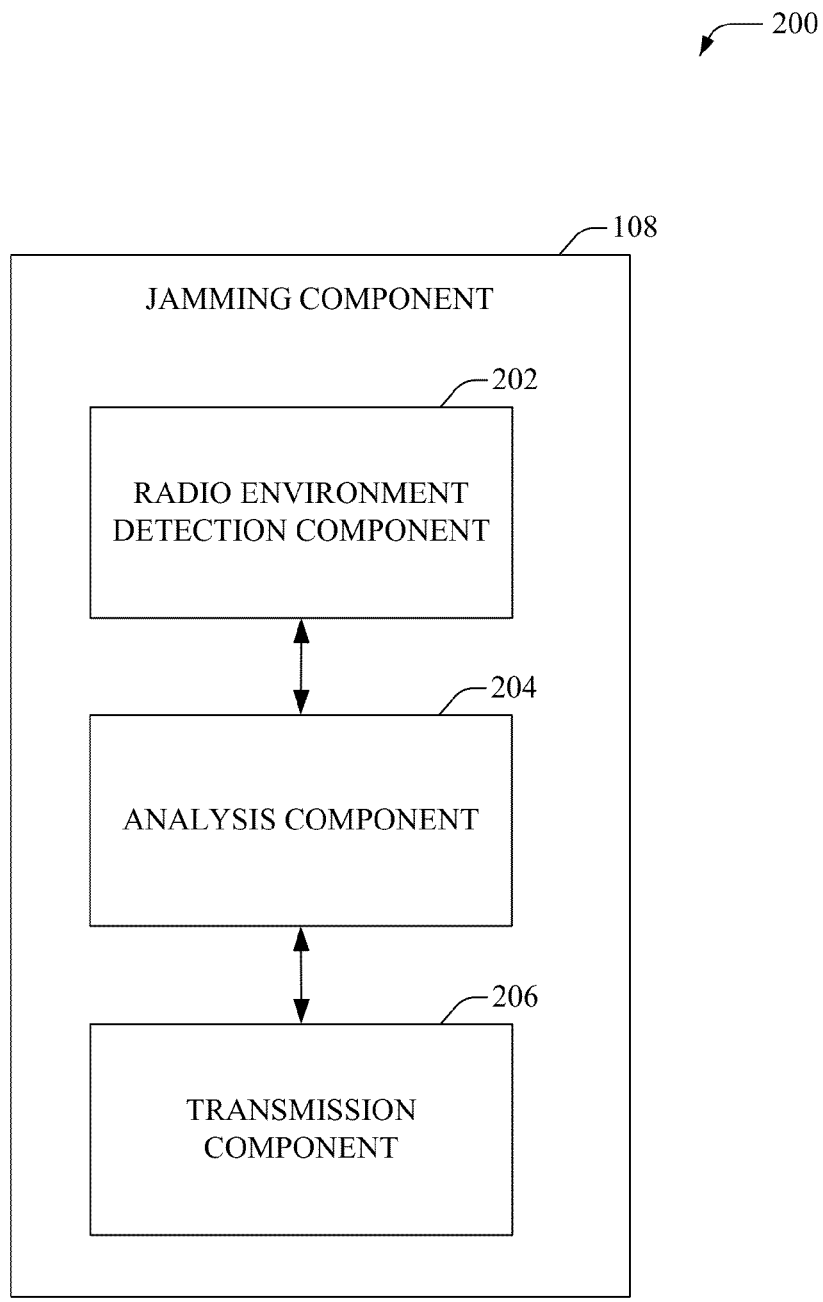
FIG. 2 illustrates an example system that can be employed for femto jamming of a macro pilot.

Referring to FIG. 2, there illustrated is an example system 200 that can be employed for femto jamming of a macro pilot in accordance with an aspect of the subject disclosure. Typically, a jamming component 108 can reside within a femto AP, and/or be operatively connected to the femto AP. It can be appreciated that the jamming component 108 can include functionality, as more fully described herein, for example, with regard to system 100.

According to an aspect, the jamming component 108 can include a radio environment detection component 202 that can be employed to scan a radio environment surrounding and/or near the femto AP. It can be appreciated that although the radio environment detection component 202 is depicted to reside within the jamming component 108, the radio environment detection component 202 can be operatively connected to the jamming component 108. In one example, when the femtocell is powered on (and/or periodically, and/or on demand), the radio environment detection component 202 can turn off a femtocell transmitter and turn on a scan receiver, which can scan the radio environment near the femtocell. Typically, the scan receiver can identify surrounding macro network carriers, including, but not limited to, UMTS carriers, GSM carriers, etc. This procedure can typically be employed by the femtocell for carrier selection and/or neighbor creation. Further, in one aspect, the radio environment detection component 202 can identify macro carriers that provide strong or high carrier quality, which is sufficient for successful UE communication. In one aspect, the signal quality and/or signal strength of the identified macro networks can be compared to a scan trigger threshold, below which a UE performs a carrier frequency scan. The radio environment detection component 202 can determine one or more macro carriers that provide a signal quality and/or signal strength greater or equal to the scan trigger threshold.

An analysis component 204 can be utilized to determine an amount of interference that can be transmitted to degrade the quality of the one or more macro carriers. For example, the analysis component 204 can analyze information provided by the radio environment detection component 202 to identify a macro carrier that can be jammed with the interference. According to one aspect, the analysis component 204 can calculate an amount of power utilized by the femtocell to cause macro signal jamming. Moreover, the analysis component 204 can utilize information, such as but not limited to, signal strength of the macro carrier and/or scan trigger threshold levels associated with a UE, etc., to calculate the amount of power utilized. For example, if observed macro signal strength (e.g., determined by the radio environment detection component 202) is "X" db and the scan trigger threshold employed by UEs is "Y" db, the amount of interference determined by the analysis component 204 can be at least "X-Y" db. Typically, a minimum level of power can be utilized that can trigger scanning at the UE.

Further, the analysis component 204 can determine a time period when the interference can be introduced to lower macro signal quality. According to one aspect, the radio environment detection component 202 can determine the number of UEs that are within a femto coverage area. The analysis component 204 can utilize this information to determine when to perform jamming. For example, if there are no UEs within the femto coverage area, the analysis component 204, can avoid jamming the macro carrier signal and conserve power. In another example, when the femtocell is serving a maximum number of UEs, the analysis component 204, can avoid jamming the macro carrier signal to prevent overloading the femtocell. Further, in another example, when the radio environment detection component 202 detects one or more UEs (less than a maximum number) that are roaming within the femtocell coverage area, the analysis component 204 can determine a time period to efficiently perform jamming without degrading or killing macro communication (e.g., voice, video or data).

In one embodiment, the jamming component 108 can include (and/or be operatively connected to) a transmission component 206 that can transmit the measured amount of interference based in part on information provided by the analysis component 204. The transmission component 206 can facilitate periodically switching between a femto frequency and a macro frequency based on a timing specified by the analysis component 204. For example, the analysis component 204 can determine a switching time period based on the dwell time of the femto vs. macro carrier that can be optimized such that a scan can be performed at a UE in response to the transmission. In one aspect, the transmission component 206 ensures that the femto AP can transmit on the femto frequency, during a pulse, such that a UE within the femtocell coverage area can detect and camp on to the femtocell. Further, during alternate pulses, the transmission component 206 ensures that the femto AP can transmit a low-level version of the macro carrier, as determined by the analysis component 204, which can trigger a carrier frequency scan at UE.

In addition, the analysis component 204 can also determine when the transmission component 206 can facilitate femto pilot gating. For example, the analysis component 204 can enable the transmission component 206 to perform femto pilot gating when the femtocell is servicing a maximum number of UEs, or a UE is not detected within the femtocell coverage area, etc. Moreover, the transmission component 206 can enable a pilot signal transmitter at the femtocell to alternate between high and low power (or off) according to a defined duty cycle, sequence and pattern (e.g., defined by the analysis component 204). This can prevent unnecessary interference to femtocell subscribers in surrounding femtocells and/or unnecessary signaling with nearby handsets unsuccessfully attempting to attach to femto access point(s), and accordingly conserves battery life and resources. For example, passerby subscriber stations can perform pilot measurements, or scans, in active mode, e.g., during a call or data session. Fast moving mobiles served by macro network(s) are substantially less likely to attempt handover to a femto AP with a duty cycle substantially below 100%, e.g., "always-on" operation. Femto AP operation at a nearly-off and/or off power substantially mitigates attachment signaling by substantially confining femtocell coverage to a smaller area. Reduction of attachment signaling associated with handover in an active call or data session can reduce signaling system #7 (SS7) signaling load and improve network operation. According to one aspect, the transmission component 206 can enable the femto AP transmitter to alternate between a high power and an off state, and enable a scan receiver during the off state to scan the radio environment surrounding the femto AP. Moreover, the scan receiver can receive interference measurement during the off cycle that can be employed by the analysis component 204 to generate an optimal interference value.

Figure 3:
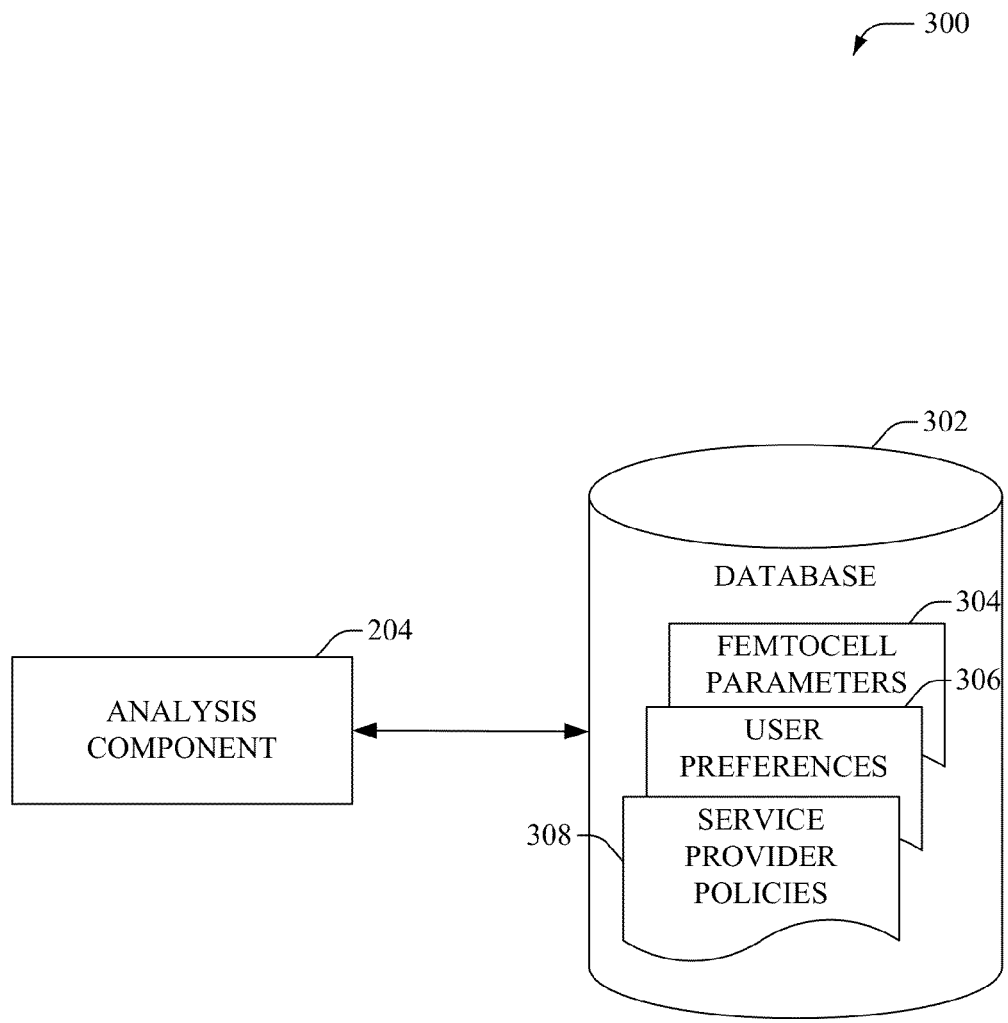
FIG. 3 illustrates an example system that can be employed to facilitate analysis during femto jamming of a macro carrier signal.

Referring now to FIG. 3, there illustrated is an example system 300 that can be employed to facilitate analysis during femto jamming of a macro carrier signal, according to an aspect of the subject disclosure. Typically, the analysis component 204 can utilize information from the radio environment detection component (FIG. 2, 202) to ascertain a macro channel and an amount of interference required to trigger UE scanning. For example, the jamming level can be "X" db less than the measured macro level, such that "X" must be just enough to trigger scanning without degrading or dropping macro calls. It can be appreciated that the analysis component 204 can include functionality, as more fully described herein, for example, with regard to system 200.

In one aspect, the analysis component 204 can utilize information from a database 302 to perform analysis. It can be appreciated that the database 302 can be most any type of database, and, can be local to the femto AP, remotely connected to the femto AP, or distributed. In particular, the database 302 can store most any information that can enable the analysis component 204 to determine when and/or how to perform femtocell jamming. According to one embodiment, database 302 can store femtocell parameters 304, such as, but not limited to, maximum number of UEs that can be serviced by the femtocell, duty cycle, sequence and/or pattern utilized by a femtocell transmitter during jamming, etc. Further, database 302 can include user preferences 306 that can be defined by a user, for example, a femto AP owner. In one aspect, the user can define user preferences 306 during an initial setup phase. However, it can be appreciated that the user preferences 306 can be updated at most any time. Furthermore, the database can include one or more service provider policies 308 that can be specified by a service provider during provisioning, and/or updated periodically, and/or on demand by the service provider. The user preferences 306 and/or service provider policies 308 can be utilized by the analysis component 204 to facilitate selection of a macro carrier, determination of an amount of interference, determination of a timing sequence associated with interference, etc.

It can be appreciated that the database 302 can include volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases) of the subject systems and methods is intended to comprise, without being limited to, these and any other suitable types of memory.

Figure 4:
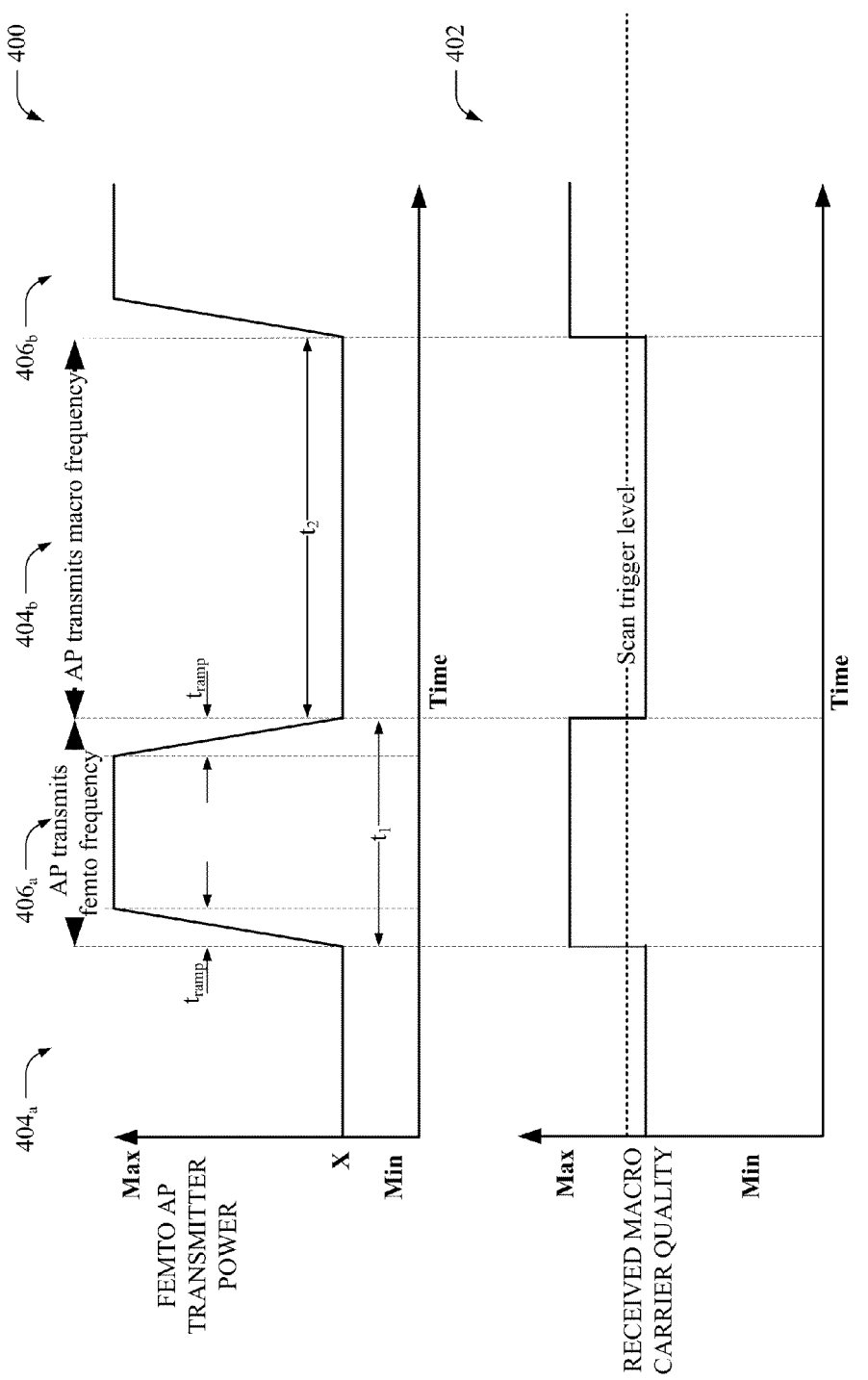
FIG. 4 illustrates timing diagrams that depict power transmitted at a femto access point (AP) and received macro signal quality at a UE respectively, according to an aspect of the subject specification.

FIG. 4 illustrates timing diagrams 400 and 402 that depict power transmitted at a femto AP and received macro signal quality at a UE respectively, according to an aspect of the subject specification. One or more embodiments disclosed herein can trigger device scanning in specific areas otherwise dominated by macro cells only, without triggering unnecessary scanning and battery life degradation elsewhere. Specifically, timing diagram 400 illustrates a graph of the femto AP transmitter power vs. time.

Typically, a jamming component (FIG. 2) upon power-up, periodically, and/or on demand, can scan the radio environment to identify which nearby macro sector carriers are strongest. As discussed supra, measurements received and/or information stored in a database (FIG. 3) can be employed to ascertain a macro channel and an amount of interference required to trigger handset scanning. With reference to timing diagram 400, the jamming component (FIG. 2) can ensure that the femto AP transmitter can transmit the determined level of interference "X" on the identified macro carrier's frequency, during intervals $404_a$, $404_b$, etc. In addition, the jamming component (FIG. 2) can ensure that the femto AP transmitter transmits on femto frequency by utilizing maximum power during alternate intervals $406_a$, $406_b$, etc.

Timing diagram 402 illustrates a graph of the macro carrier quality received at a UE vs. time. Moreover, during intervals $404_a$, $404_b$, etc., the received quality of the macro carrier signal is lower than a scan trigger level, due to the interference (X) introduced by the femtocell transmitter. It can be appreciated that interference X can be calculated (e.g., by the analysis component 204) in a manner such that X is enough to trigger scanning without degrading or killing macro calls. Since the received macro carrier quality is below the scan trigger level, the UE can search for different carrier frequencies, for example during intervals $406_a$, $406_b$, etc. Further, since the femto AP transmitter transmits maximum power on femto frequency during intervals $406_a$, $406_b$, etc., the UE can detect the femto AP, when the UE is within the femto coverage area, and perform attachment signaling to access the femto network. Accordingly, the subject system allows for the practical deployment and predictable usage of femtocells in areas where macro carrier quality is strong.

The interference X, generated due to femtocell jamming, ensures that the received macro carrier quality varies based on the femto AP frequency. Specifically, the UE receives a below ideal quality from the macro carrier and scans alternate frequency bands. In one aspect, the UE can detect the femto AP and attach to and/or communicate via the femto AP, for example, when the UE is authorized to access the femto AP and/or when femtocell coverage is satisfactory. It can be appreciated that time interval $t_1$ and $t_2$, and/or interference X, can be determined, for example, by the analysis component (FIG. 2).

Additionally, during intervals $406_a$, $406_b$, etc., when the femto AP is transmitting on its own carrier, the power change from X to Max (or off to Max, in case of femto gating (not shown)), or vice versa, is not instantaneous. A ramp up period, $t_{ramp}$, can be inserted, for example, by the transmission component (FIG. 2), to avoid a large amount of interference within a short time interval, which can cause the UE to lose synch with the macro cell. Thus, the power level is gradually increased, such that the UE can scan and detect the femto AP, without overloading the receiver of the UE. It can be appreciated that $t_{ramp}$ value can be predetermined, for example, by a service provider, and stored in a database (FIG. 3, 302) accessible to the femto AP. The $t_{ramp}$ value can also be dynamically adjusted or modified to achieve an optimal response at the UE.

Figure 5:
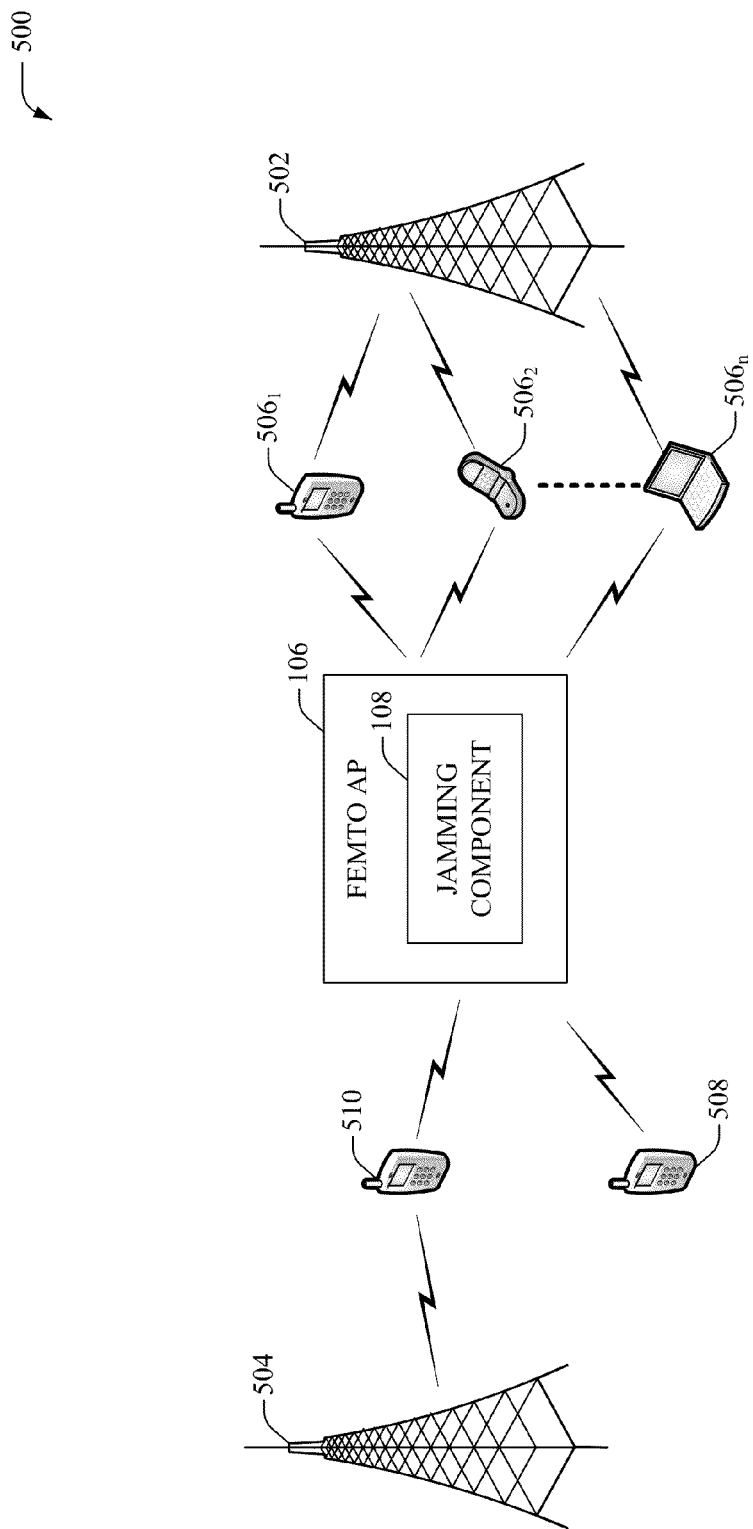
FIG. 5 illustrates an example system that facilitates efficient detection of femtocells by a UE, by employing femto jamming of macro networks.

Referring to FIG. 5, there illustrated is an example system 500 that facilitates efficient detection of femtocells by a UE, by employing femto jamming of macro networks in accordance with an aspect of the subject disclosure. According to an aspect, femto AP 106 can scan the surrounding radio environment (e.g., by utilizing the radio environment detection component 202) to identify which macro sector carriers are strongest. It can be appreciated that the jamming component 108 and femto AP 106 can include functionality, as more fully described herein, for example, with regard to system 100 and 200.

Further, it can be appreciated that femto AP 106 can be surrounded by multiple overlapping macro cells, which can utilize the same of different radio technologies. As an example, shown in FIG. 5, femto AP 106 can be in the vicinity of two base stations 502 and 504. The femto AP 106 can turn off its transmitter, and perform a scan (e.g., by utilizing the radio environment detection component 202) to identify which macro sector carriers are strongest. For example, the femto AP 106 can determine that the macro signal quality associated with base station 502 is above scan threshold of UEs $506_{1-n}$ (wherein n can be most any natural number from one to infinity). Accordingly, jamming component 108, can determine a measured amount of interference that can be transmitted to trigger carrier frequency scanning at the UEs $506_{1-n}$.

In one example, the jamming component 108 can determine various factors involved in femto jamming, such as, but not limited to, a time period when the interference can be transmitted, a ramp period wherein the femto transmitter can gradually increase power from the interference level to the maximum power, the number of UEs that are attached to the femto AP 106, maximum number of UEs that can be serviced by the femto AP 106, etc. As an example, a UE 508 can be attached to the femto AP 106. Thus, the jamming component 108 can determine that the femtocell is not overloaded and accordingly transmit the measured amount of interference to the UEs $506_{1-n}$. Due to the interference introduced by the jamming component 108, the UEs $506_{1-n}$ can detect a decrease in the macro carrier quality. When the macro carrier quality falls below a scan trigger level, the UEs $506_{1-n}$ can scan for disparate carrier frequencies. Moreover, the UEs $506_{1-n}$ can detect the femto AP 106 and attempt to attach to the femto access network. The femto AP 106 can allow authorized UEs $506_{1-n}$ to connect to the femto access network based at least in part on an access list (e.g., a white list). In one aspect, the femto AP 106 transmitter can return to normal operation as soon as a first UE has successfully attached.

Further, according to one embodiment, the femto AP 106 can employ femto pilot gating during transmission, such that, when the femto AP 106 is idle (e.g., no attached subscribers), the femtocell pilot transmitter can alternate between high and off power states, based on a specified duty cycle, sequence and/or pattern. During the off state, the femto AP 106 can scan the surrounding radio environment (e.g., by utilizing the radio environment detection component 202) and detect UE 510 connected to a macro base station 504, which provides a satisfactory macro carrier signal quality for communication. As described supra, the jamming component 108 can create a small and measured amount of interference to the UE 510, which can be enough to trigger a carrier frequency scan at the UE 510. The carrier frequency scan performed by the UE 510 enables the UE 510 to detect and/or utilize femto AP 106 for communication cell.

Figure 6:
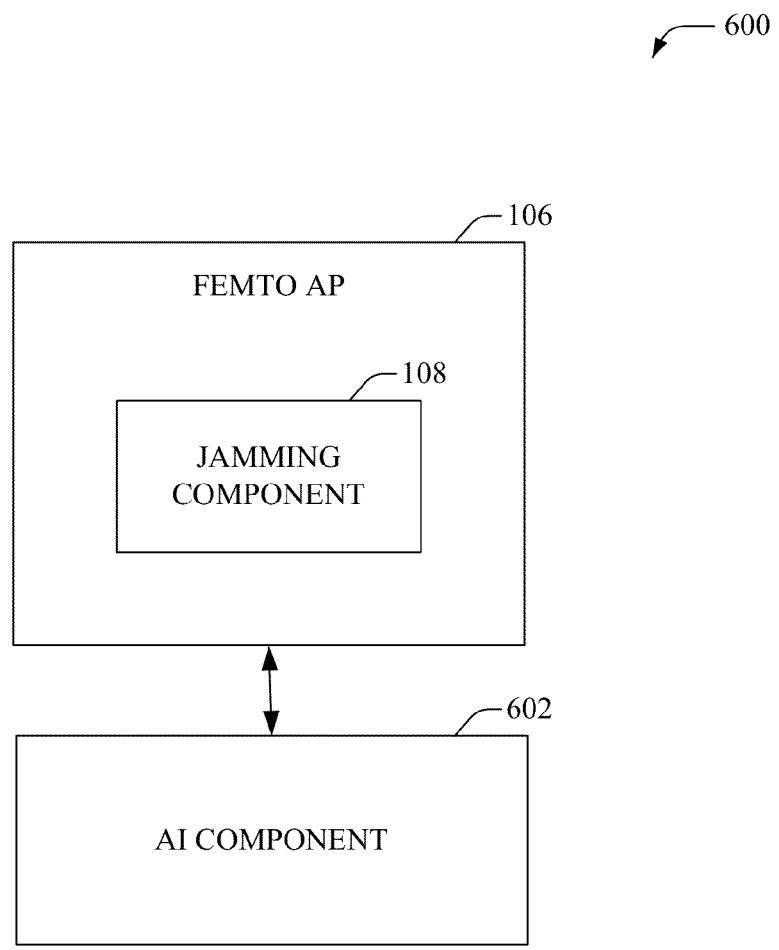
FIG. 6 illustrates an example system that facilitates automating one or more features in accordance with the subject innovation.

FIG. 6 illustrates an example system 600 that employs an artificial intelligence (AI) component 602, which facilitates automating one or more features in accordance with the subject innovation. It can be appreciated that the femto AP 106 and the jamming component 108 can include respective functionality, as more fully described herein, for example, with regard to systems 100, 200, and 500.

The subject innovation (e.g., in connection with interference measurement) can employ various AI-based schemes for carrying out various aspects thereof. For example, a process for determining when or how to perform jamming of the macro carrier can be facilitated via an automatic classifier system and process. Moreover, the classifier can be employed to determine the amount of power that can be utilized for jamming, a time period for transmitting the interference, a ramp up or ramp down period, etc.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of communication systems, for example, attributes can be information stored in database 302, and the classes can be categories or areas of interest (e.g., levels of priorities).

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing UE behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when the femtocell is likely to be underutilized and/or idle, amount of power that can be utilized for jamming, a time period for transmitting the interference, a ramp up or ramp down period, etc. The criteria can include, but is not limited to, historical patterns, UE behavior, user preferences, service provider preferences and/or policies, femto AP parameters, location of the UE, motion of the UE, location of the femtocell, etc.

Figure 7:
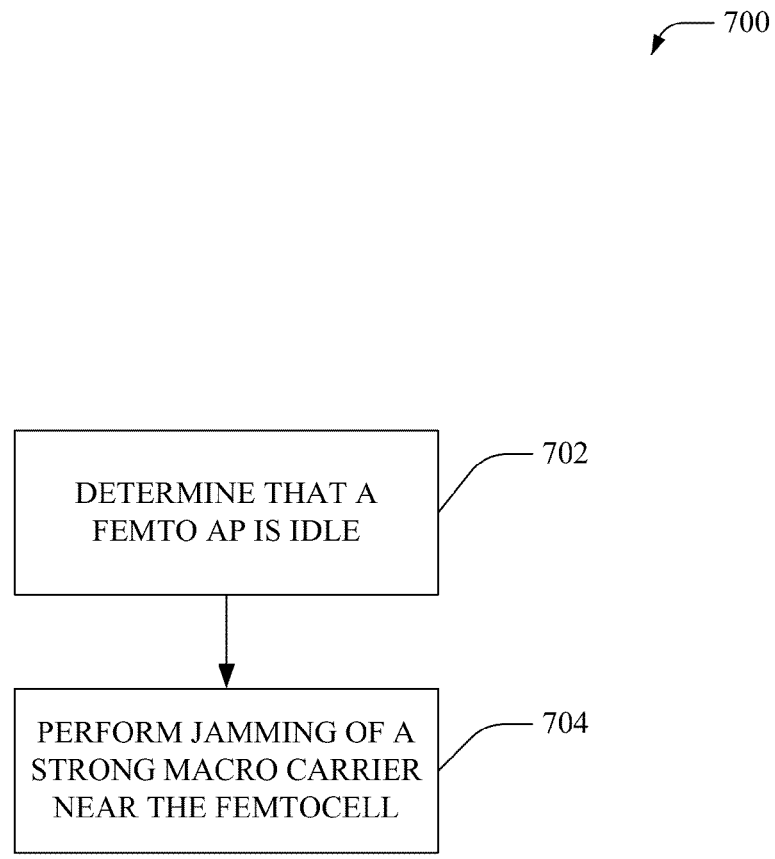
FIG. 7 illustrates an example methodology that can be utilized to facilitate detection of a femto AP by a UE, which can be attached to a macro network that provides ideal radio conditions for UE communication.
Figure 8:
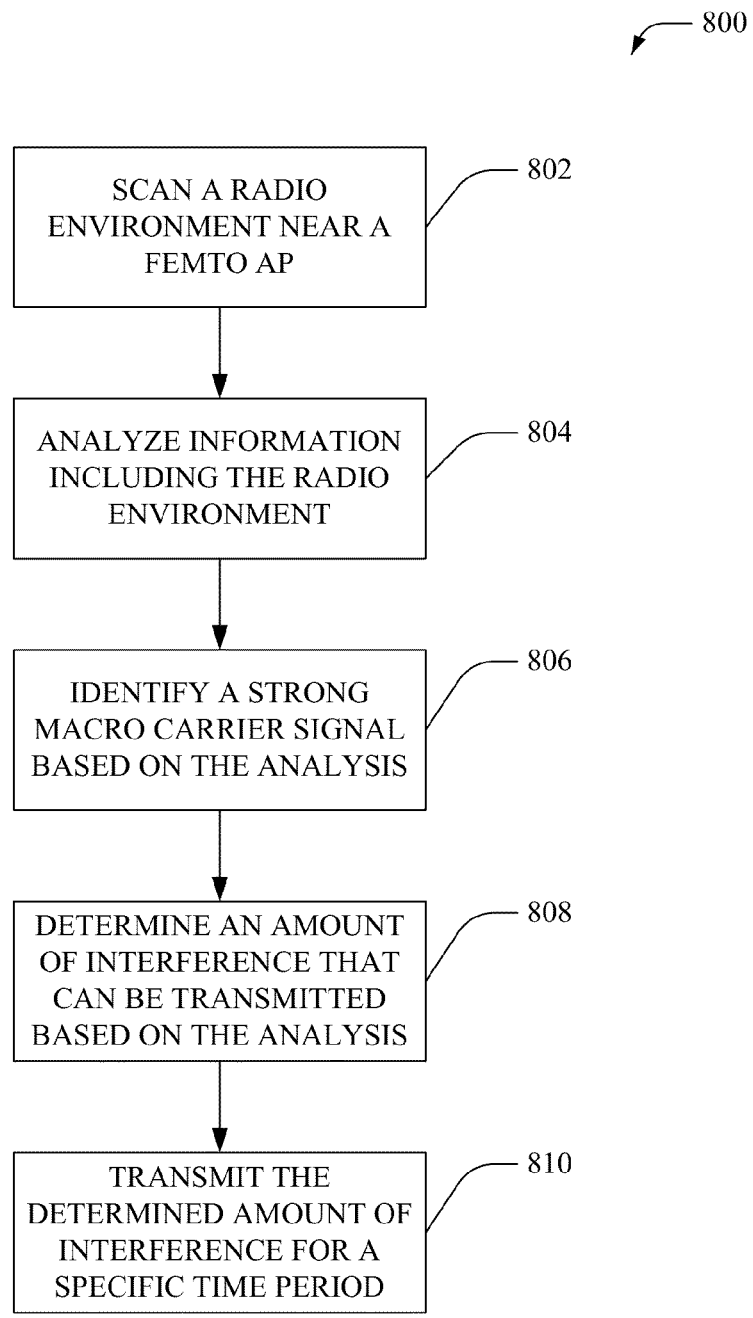
FIG. 8 illustrates an example methodology that facilitates jamming of a strong macro carrier signal.
Figure 9:
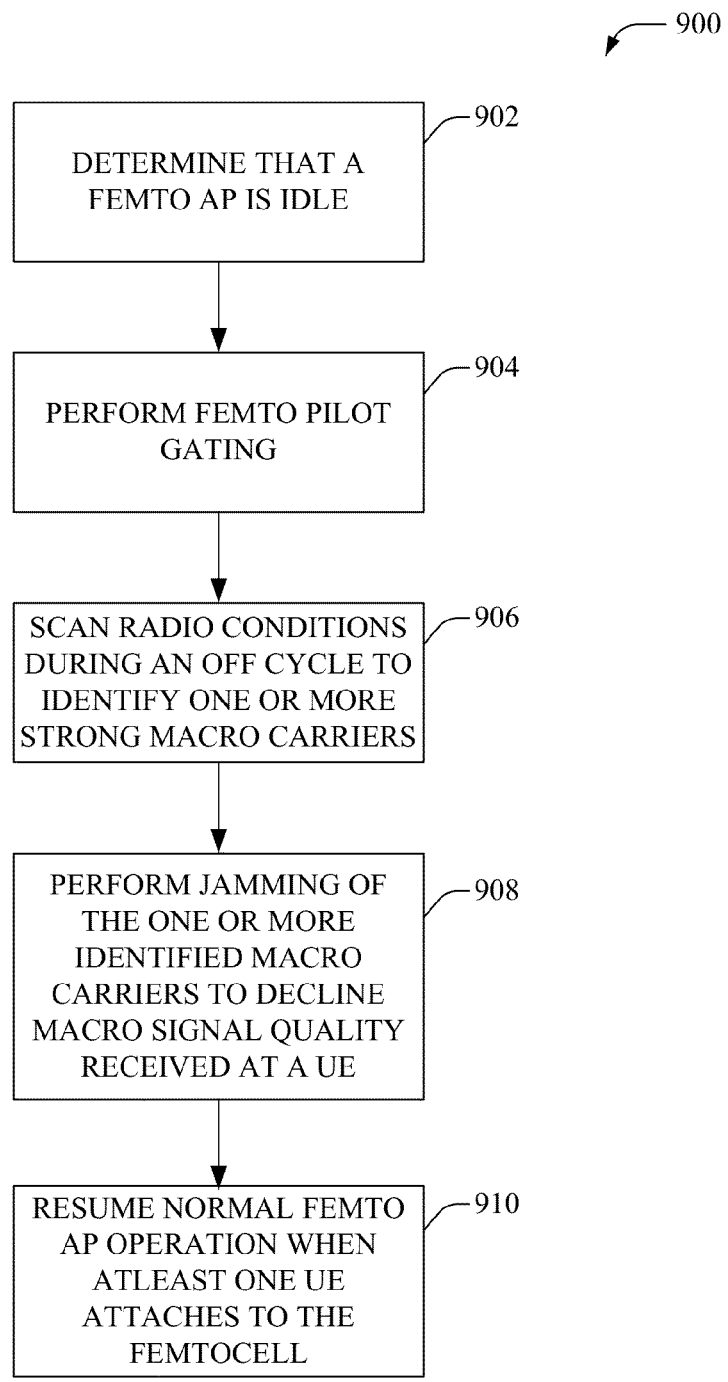
FIG. 9 illustrates an example methodology that facilitates degradation of macro signal quality, such that, a UE attached to the macro network can detect a nearby femto network.

FIGS. 7-9 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 7, illustrated is an example methodology 700 that can be utilized to facilitate detection of a femto AP by a UE, which can be attached to a macro network that provides ideal radio conditions for UE communication, according to an aspect of the subject innovation. It can be appreciated that the term "ideal" is used herein, with respect to macro network coverage and/or macro carrier signal strength, to mean that the macro carrier signal strength can be strong enough and/or satisfactory for successful UE communications.

At 702, it can be determined that the femto AP is idle. For example, when no UEs are attached to the femto AP, it can be determined that the femto AP is idle. Additionally, in one aspect, the utilization of the femto AP can be considered, for example, it can be determined when the femto AP is underutilized (e.g., less than maximum number of subscribers are attached to the femto AP). At 704, jamming of a strong macro carrier signal, near the femtocell, can be performed. In one aspect, the jamming includes detecting a strong macro carrier signal and introducing a small and measured amount of interference, in a manner such that, the macro carrier signal quality declines just enough to trigger a carrier frequency scan at a UE attached to the macro network. Accordingly, the UE can perform a scan for carrier frequencies and detect the femto AP. Moreover, on detection, most any authentication and/or authorization technique can be employed to attach the UE to the femtocell.

FIG. 8 illustrates an example methodology 800 that facilitates jamming of a strong macro carrier signal in accordance with an aspect of the subject specification. In particular, methodology 800 provides a mechanism to trigger quality-based handset scanning in areas where macro network coverage is strong and/or satisfactory for handset communication. As an example, the macro network can include most any radio environment, such as, but not limited to, UMTS, GSM, LTE, WiFi, WiMAX, CDMA, etc.

At 802, the radio environment near a femto AP can be scanned. In one example, the scanning can be performed when the femto AP is powered on, periodically at a specified time (e.g., nightly), on demand, and/or during an OFF cycle in femto gating, etc. Typically, one or more surrounding macro network carriers can be identified along with their carrier signal strength and/or quality. At 804 information can be analyzed, wherein, the information can include the scanned radio environment data. In one aspect, the information can further include, but is not limited to, femto AP parameters, UE scan trigger levels, user preferences, service provider policies, etc. At 806, a strong macro carrier signal can be identified based on the analysis. In one aspect, the signal quality and/or signal strength of the one or more macro network carriers can be compared to a UE scan trigger level. Moreover, a macro carrier signal that has a signal quality and/or signal strength greater or equal to the scan trigger threshold can be identified as a strong macro carrier signal.

At 808, an amount of interference that can be transmitted can be determined based on the analysis. Moreover, the amount of interference can be just enough to trigger a frequency scan at a UE, without degrading or killing communications between the UE and the macro network. In one aspect, an amount of power utilized by a femtocell transmitter to cause macro signal jamming can be determined. Typically, a minimum level of power can be utilized that can trigger scanning at the UE, such that UE communication is not degraded. At 810, the determined amount of interference can be transmitted, for a specific time period. As an example, the time period can be determined based on the analysis. Further, a duty cycle, sequence and/or pattern for transmission can also be determined based on the analysis. In addition, a ramp up and/or ramp down period for switching between macro frequency and femto frequency can be determined based in part on the analysis. Moreover, the transmission can cause a UE, attached to the macro network, to detect a decline in the macro carrier signal quality. When the detected quality falls below a scan trigger level, the UE scans for alternate carrier frequencies and is likely to detect the femto AP. Once detected, the UE can attach to, and access the femto network (e.g., after authorization by the femto AP). A normal femto AP operation can then be resumed.

FIG. 9 illustrates an example methodology 900 that facilitates degradation of macro signal quality such that a UE attached to the macro network can detect a nearby femto network, according to an aspect of the subject disclosure. At 902, it can be determined that a femto AP is idle. At 904, femto pilot gating can be performed, wherein a pilot signal transmitter at the femtocell can alternate between a high power and an off state. As an example, a duty cycle, sequence and/or pattern for the gating can be predefined. In one aspect, the femto pilot signal gating avoids unnecessary interference to femtocell subscribers in surrounding femtocells and/or unnecessary signaling with nearby handsets unsuccessfully attempting to attach to the femto AP.

At 906, radio conditions, for example, surrounding the femto AP can be scanned during the off state of the transmitter to identify one or more strong macro carriers. As an example, when the transmitter turns off, a scan receiver can be utilized to identify one or more strong macro carriers near the femto AP. At 908, jamming of the one or more identified macro carriers can be performed to decline the macro signal quality received at a UE, for example, to a level that triggers a carrier frequency scan by the UE. Moreover, during the carrier frequency scan, the UE can detect and attach to the femto AP, based on authorization from the femto AP. At 910, normal femto AP operation (e.g., no gating or macro jamming) can be resumed when at least one UE successfully attaches to the femtocell.

Figure 10:
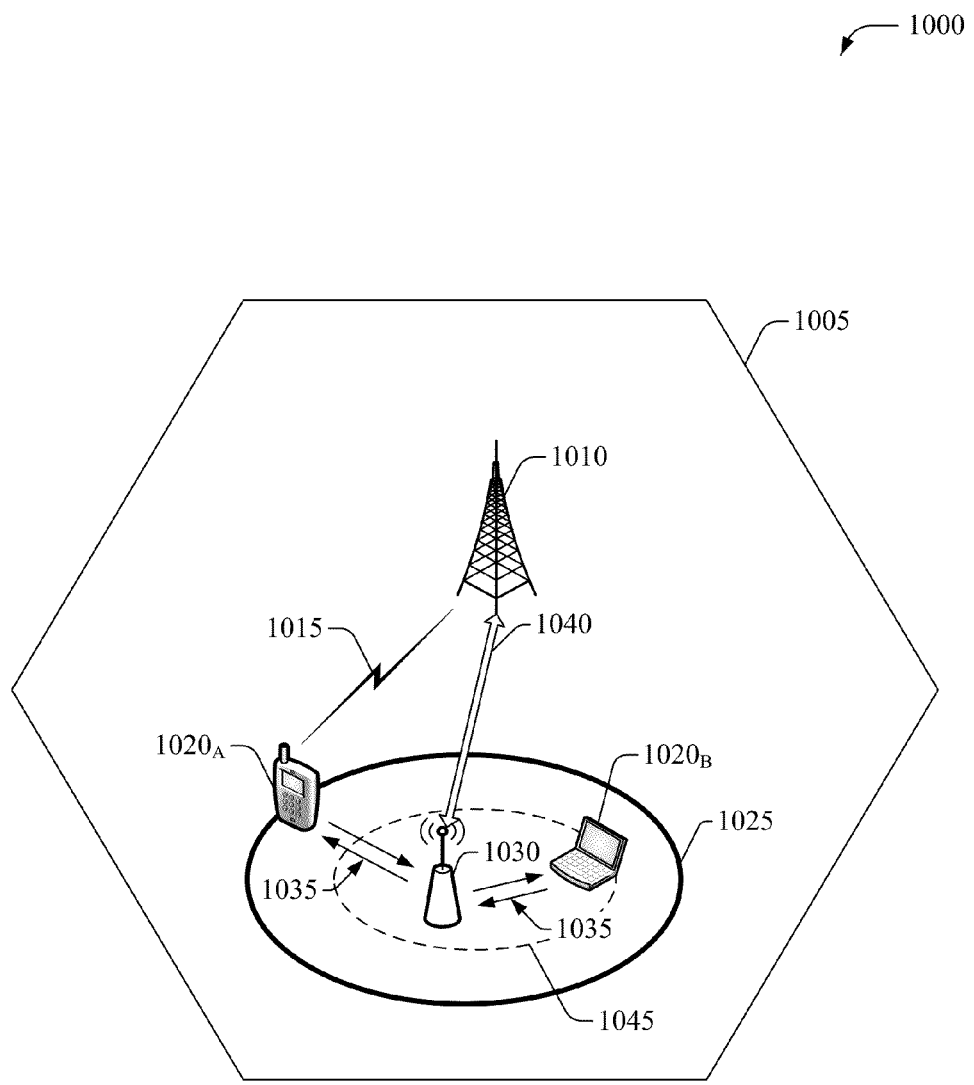
FIG. 10 illustrates an example wireless communication environment with associated components for operation of a femtocell in accordance with the subject specification.

FIG. 10 illustrates a schematic wireless environment 1000 (e.g., a network) in which a femtocell can exploit various aspects of the subject innovation in accordance with the disclosed subject matter. In wireless environment 1000, area 1005 can represent a coverage macro cell, which can be served by base station 1010. Macro coverage is generally intended for outdoors locations for servicing mobile wireless devices, like UE $1020_A$, and such coverage is achieved via a wireless link 1015. In an aspect, UE 1020 can be a 3GPP Universal Mobile Telecommunication System (UMTS) mobile phone.

Within macro coverage cell 1005, a femtocell 1045, served by a femto access point 1030, can be deployed. A femtocell typically can cover an area 1025 that is determined, at least in part, by transmission power allocated to femto AP 1030, path loss, shadowing, and so forth. Coverage area typically can be spanned by a coverage radius that ranges from 20 to 50 meters. Confined coverage area 1045 is generally associated with an indoors area, or a building, which can span about 5000 sq. ft. Generally, femto AP 1030 typically can service a number (e.g., a few or more) wireless devices (e.g., subscriber station $1020_B$) within confined coverage area 1045. In an aspect, femto AP 1030 can integrate seamlessly with substantially any PS-based and CS-based network; for instance, femto AP 1030 can integrate into an existing 3GPP Core via conventional interfaces like Iu-CS, Iu-PS, Gi, Gn. In another aspect, femto AP 1030 can exploit high-speed downlink packet access in order to accomplish substantive bitrates. In yet another aspect, femto AP 1030 has a LAC (location area code) and RAC (routing area code) that can be different from the underlying macro network. These LAC and RAC are used to identify subscriber station location for a variety of reasons, most notably to direct incoming voice and data traffic to appropriate paging transmitters.

As a subscriber station, e.g., UE $1020_A$, can leave macro coverage (e.g., cell 1005) and enters femto coverage (e.g., area 1015), as illustrated in environment 1000. According to one aspect, the femto AP 1030 can perform macro signal jamming, as described above, and decline macro signal quality received at the UE $1020_A$. A carrier frequency scan can be triggered by the UE $1020_A$, which can detect the femto AP 1030. UE $1020_A$ can attempt to attach to the femto AP 1030 through transmission and reception of attachment signaling, effected via a FL/RL 1035; in an aspect, the attachment signaling can include a Location Area Update (LAU) and/or Routing Area Update (RAU). Attachment attempts are a part of procedures to ensure mobility, so voice calls and sessions can continue even after a macro-to-femto transition or vice versa. It is to be noted that UE 1020 can be employed seamlessly after either of the foregoing transitions. Femto networks are also designed to serve stationary or slow-moving traffic with reduced signaling loads compared to macro networks. A femto service provider (e.g., an entity that commercializes, deploys, and/or utilizes femto AP 1030) therefore can be inclined to minimize unnecessary LAU/RAU signaling activity at substantially any opportunity to do so, and through substantially any available means. It is to be noted that substantially any mitigation of unnecessary attachment signaling/control can be advantageous for femtocell operation. Conversely, if not successful, UE 1020 generally can be commanded (through a variety of communication means) to select another LAC/RAC or enter "emergency calls only" mode. It is to be appreciated that this attempt and handling process can occupy significant UE battery, and femto AP capacity and signaling resources as well.

When an attachment attempt is successful, UE 1020 can be allowed on femtocell 1025 and incoming voice and data traffic can be paged and routed to the subscriber station through the femto AP 1030. It is to be noted also that data traffic is typically routed through a backhaul broadband wired network backbone 1040 (e.g., optical fiber backbone, twisted-pair line, T1/E1 phone line, DSL, or coaxial cable). It is to be noted that as a femto AP 1030 generally can rely on a backhaul network backbone 1040 for routing and paging, and for packet communication, substantially any quality of service can handle heterogeneous packetized traffic. Namely, packet flows established for wireless communication devices (e.g., terminals $1020_A$ and $1020_B$) served by femto AP 1030, and for devices served through the backhaul network pipe 1040. It is to be noted that to ensure a positive subscriber experience, or perception, it is desirable for femto AP 1030 to maintain a high level of throughput for traffic (e.g., voice and data) utilized on a mobile device for one or more subscribers while in the presence of external, additional packetized, or broadband, traffic associated with applications (e.g., web browsing, data transfer (e.g., content upload), and the like) executed in devices within the femto coverage area (e.g., area 1025 or area 1045).

Figure 11:
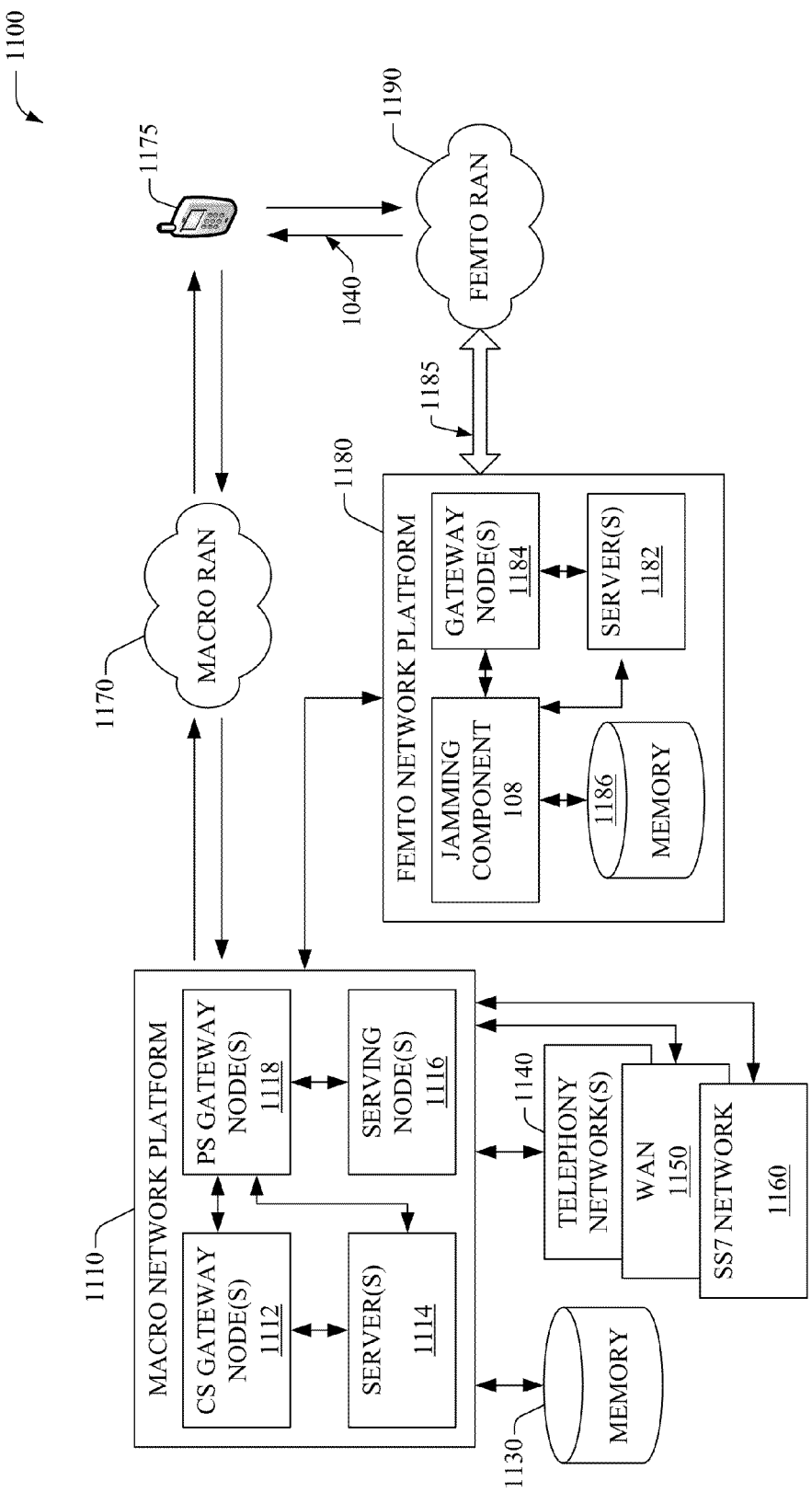
FIG. 11 illustrates a schematic deployment of a macro cell and a femtocell for wireless coverage in accordance with aspects of the disclosure.
Figure 12:
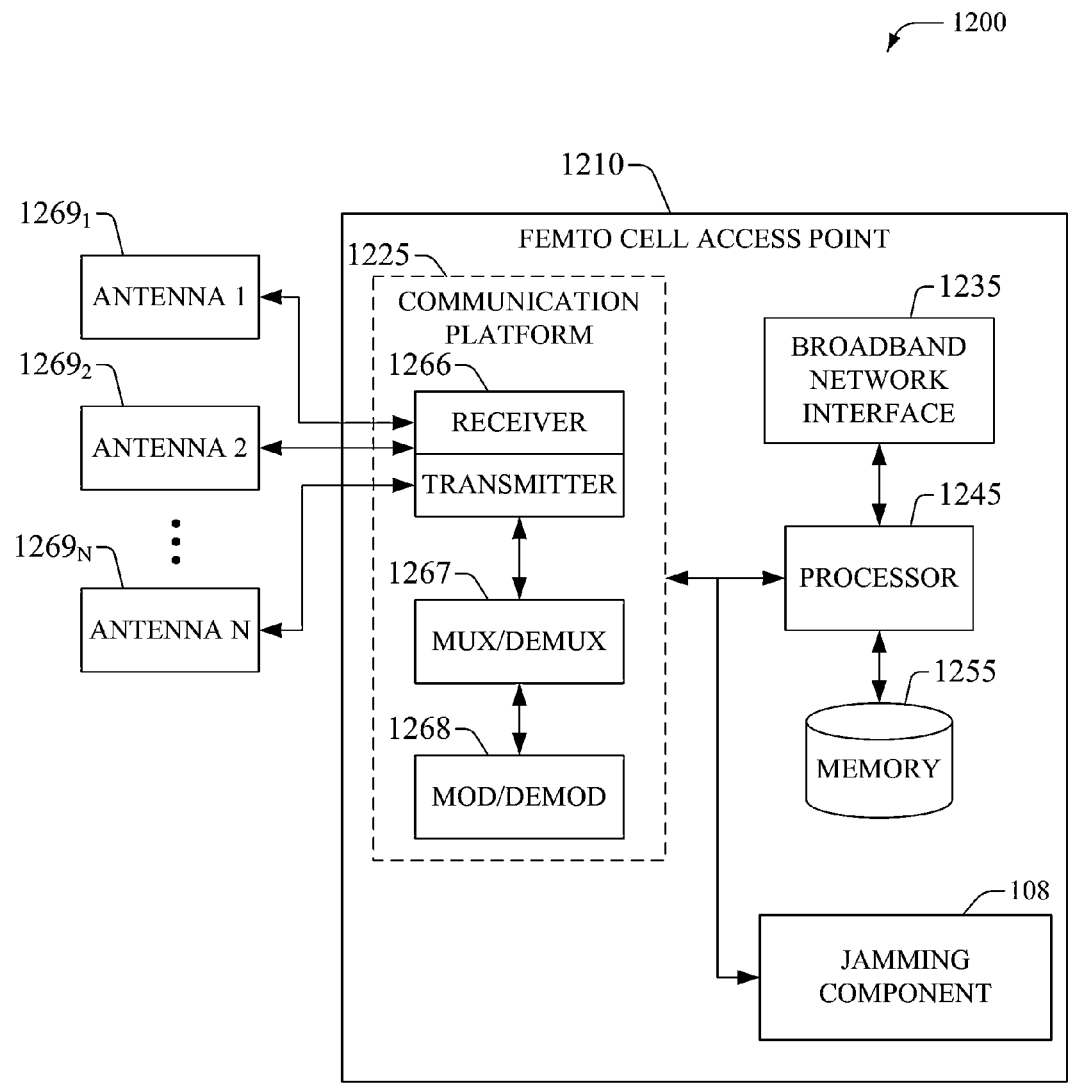
FIG. 12 illustrates an example embodiment of a femto access point that can facilitate femto jamming of a macro pilot, according to the subject disclosure.

To provide further context for various aspects of the subject specification, FIGS. 11 and 12 illustrate, respectively, an example wireless communication environment 1100, with associated components for operation of a femtocell, and a block diagram of an example embodiment 1200 of a femto access point, which can facilitate macro pilot jamming in accordance with aspects described herein.

Wireless communication environment 1100 includes two wireless network platforms: (i) A macro network platform 1110 that serves, or facilitates communication) with user equipment 1175 via a macro radio access network (RAN) 1170. It should be appreciated that in cellular wireless technologies (e.g., 3GPP UMTS, HSPA, 3GPP LTE, 3GPP UMB), macro network platform 1110 is embodied in a Core Network. (ii) A femto network platform 1180, which can provide communication with UE 1175 through a femto RAN 1190 linked to the femto network platform 1180 via backhaul pipe(s) 1185, wherein backhaul pipe(s) are substantially the same a backhaul link 1040. It should be appreciated that femto network platform 1180 typically offloads UE 1175 from macro network, once UE 1175 attaches (e.g., through macro-to-femto handover, or via a scan of channel resources in idle mode) to femto RAN. According to an aspect, the jamming component 108, can generate and transmit a small and measured amount of interference that degrades macro signal quality enough to trigger a carrier frequency scan by UE 1175, which can then detect and attach to the femto network platform 1180. Further, it can be appreciated that the jamming component 108 can include functionality, more fully described herein, for example, with respect to systems 100, 200, 500, and 600.

It is noted that RAN includes base station(s), or access point(s), and its associated electronic circuitry and deployment site(s), in addition to a wireless radio link operated in accordance with the base station(s). Accordingly, macro RAN 1170 can comprise various coverage cells like cell 1005, while femto RAN 1190 can comprise multiple femtocell access points. As mentioned above, it is to be appreciated that deployment density in femto RAN 1190 is substantially higher than in macro RAN 1170.

Generally, both macro and femto network platforms 1110 and 1180 can include components, e.g., nodes, gateways, interfaces, servers, or platforms, that facilitate both packet-switched (PS) and circuit-switched (CS) traffic (e.g., voice and data) and control generation for networked wireless communication. For example, macro network platform 1110 includes CS gateway node(s) 1112 which can interface CS traffic received from legacy networks like telephony network(s) 1140 (e.g., public switched telephone network (PSTN), or public land mobile network (PLMN)) or a SS7 network 1160. Moreover, CS gateway node(s) 1112 interfaces CS-based traffic and signaling and gateway node(s) 1118.

In addition to receiving and processing CS-switched traffic and signaling, gateway node(s) 1118 can authorize and authenticate PS-based data sessions with served (e.g., through macro RAN) wireless devices. Data sessions can include traffic exchange with networks external to the macro network platform 1110, like wide area network(s) (WANs) 1150; it should be appreciated that local area network(s) (LANs) can also be interfaced with macro network platform 1110 through gateway node(s) 1118. Gateway node(s) 1118 generates packet data contexts when a data session is established. It should be further appreciated that the packetized communication can include multiple flows that can be generated through server(s) 1114. Macro network platform 1110 also includes serving node(s) 1116 that convey the various packetized flows of information, or data streams, received through gateway node(s) 1118. It is to be noted that server(s) 1114 can include one or more processor configured to confer at least in part the functionality of macro network platform 1110. To that end, the one or more processor can execute code instructions stored in memory 1130, for example.

In example wireless environment 1100, memory 1130 stores information related to operation of macro network platform 1110. Information can include business data associated with subscribers; market plans and strategies, e.g., promotional campaigns, business partnerships; operational data for mobile devices served through macro network platform; service and privacy policies; end-user service logs for law enforcement; and so forth. Memory 1130 can also store information from at least one of telephony network(s) 1140, WAN(s) 1150, or SS7 network 1160.

Femto gateway node(s) 1184 have substantially the same functionality as PS gateway node(s) 1118. Additionally, femto gateway node(s) 1184 can also include substantially all functionality of serving node(s) 1116. In an aspect, femto gateway node(s) 1184 facilitates handover resolution, e.g., assessment and execution. Server(s) 1182 have substantially the same functionality as described in connection with server(s) 1114 and can include one or more processor configured to confer at least in part the functionality of macro network platform 1110. To that end, the one or more processor can execute code instructions stored in memory 1186, for example.

Memory 1186 can include information relevant to operation of the various components of femto network platform 1180. For example operational information that can be stored in memory 1186 can comprise, but is not limited to, subscriber information; contracted services; maintenance and service records; femtocell configuration (e.g., devices served through femto RAN 1190; access control lists, or white lists); service policies and specifications; privacy policies; add-on features; and so forth With respect to FIG. 12, in example embodiment 1200, femtocell AP 1210 can receive and transmit signal(s) (e.g., traffic and control signals) from and to wireless devices, access terminals, wireless ports and routers, etc., through a set of antennas $1269_1$-$1269_N$. It should be appreciated that while antennas $1269_1$-$1269_N$ are a part of communication platform 1225, which comprises electronic components and associated circuitry that provides for processing and manipulating of received signal(s) (e.g., a packet flow) and signal(s) (e.g., a broadcast control channel) to be transmitted. In an aspect, communication platform 1225 includes a transmitter/receiver (e.g., a transceiver) 1266 that can convert signal(s) from analog format to digital format upon reception, and from digital format to analog format upon transmission. In addition, receiver/transmitter 1266 can divide a single data stream into multiple, parallel data streams, or perform the reciprocal operation. Coupled to transceiver 1266 is a multiplexer/demultiplexer 1267 that facilitates manipulation of signal in time and frequency space. Electronic component 1267 can multiplex information (data/traffic and control/signaling) according to various multiplexing schemes such as time division multiplexing (TDM), frequency division multiplexing (EDM), orthogonal frequency division multiplexing (OFDM), code division multiplexing (CDM), space division multiplexing (SDM). In addition, mux/demux component 1267 can scramble and spread information (e.g., codes) according to substantially any code known in the art; e.g., Hadamard-Walsh codes, Baker codes, Kasami codes, polyphase codes, and so on. A modulator/demodulator 1268 is also a part of operational group 1225, and can modulate information according to multiple modulation techniques, such as frequency modulation, amplitude modulation (e.g., M-ary quadrature amplitude modulation (QAM), with M a positive integer), phase-shift keying (PSK), and the like.

Femto access point 1210 also includes a processor 1245 configured to confer functionality, at least partially, to substantially any electronic component in the femto access point 1210, in accordance with aspects of the subject innovation. In particular, processor 1245 can facilitate femto AP 1210 to implement configuration instructions received through communication platform 1225, which can include storing data in memory 1255. In addition, processor 1245 facilitates femto AP 1210 to process data (e.g., symbols, bits, or chips) for multiplexing/demultiplexing, such as effecting direct and inverse fast Fourier transforms, selection of modulation rates, selection of data packet formats, inter-packet times, etc. Moreover, processor 1245 can manipulate antennas $1269_1$-$1269_N$ to facilitate beamforming or selective radiation pattern formation, which can benefit specific locations (e.g., basement, home office . . . ) covered by femto AP; and exploit substantially any other advantages associated with smart-antenna technology. Memory 1255 can store data structures, code instructions, system or device information like device identification codes (e.g., IMEI, MSISDN, serial number . . . ) and specification such as multimode capabilities; code sequences for scrambling; spreading and pilot transmission, floor plan configuration, access point deployment and frequency plans; and so on. Moreover, memory 1255 can store configuration information such as schedules and policies; femto AP address(es) or geographical indicator(s); access lists (e.g., white lists); license(s) for utilization of add-features for femto AP 1210, and so forth.

In embodiment 1200, processor 1245 is coupled to the memory 1255 in order to store and retrieve information necessary to operate and/or confer functionality to communication platform 1225, broadband network interface 1235 (e.g., a broadband modem), and other operational components (e.g., multimode chipset(s), power supply sources . . . ; not shown) that support femto access point 1210. The femto AP 1210 can further include a jamming component 108, which can include functionality, as more fully described herein, for example, with regard to systems 100, 200, 500, and 600. In addition, it is to be noted that the various aspects disclosed in the subject specification can also be implemented through (i) program modules stored in a computer-readable storage medium or memory (e.g., memory 1186 or memory 1255) and executed by a processor (e.g., processor 1245), or (ii) other combination(s) of hardware and software, or hardware and firmware.

Figure 13:
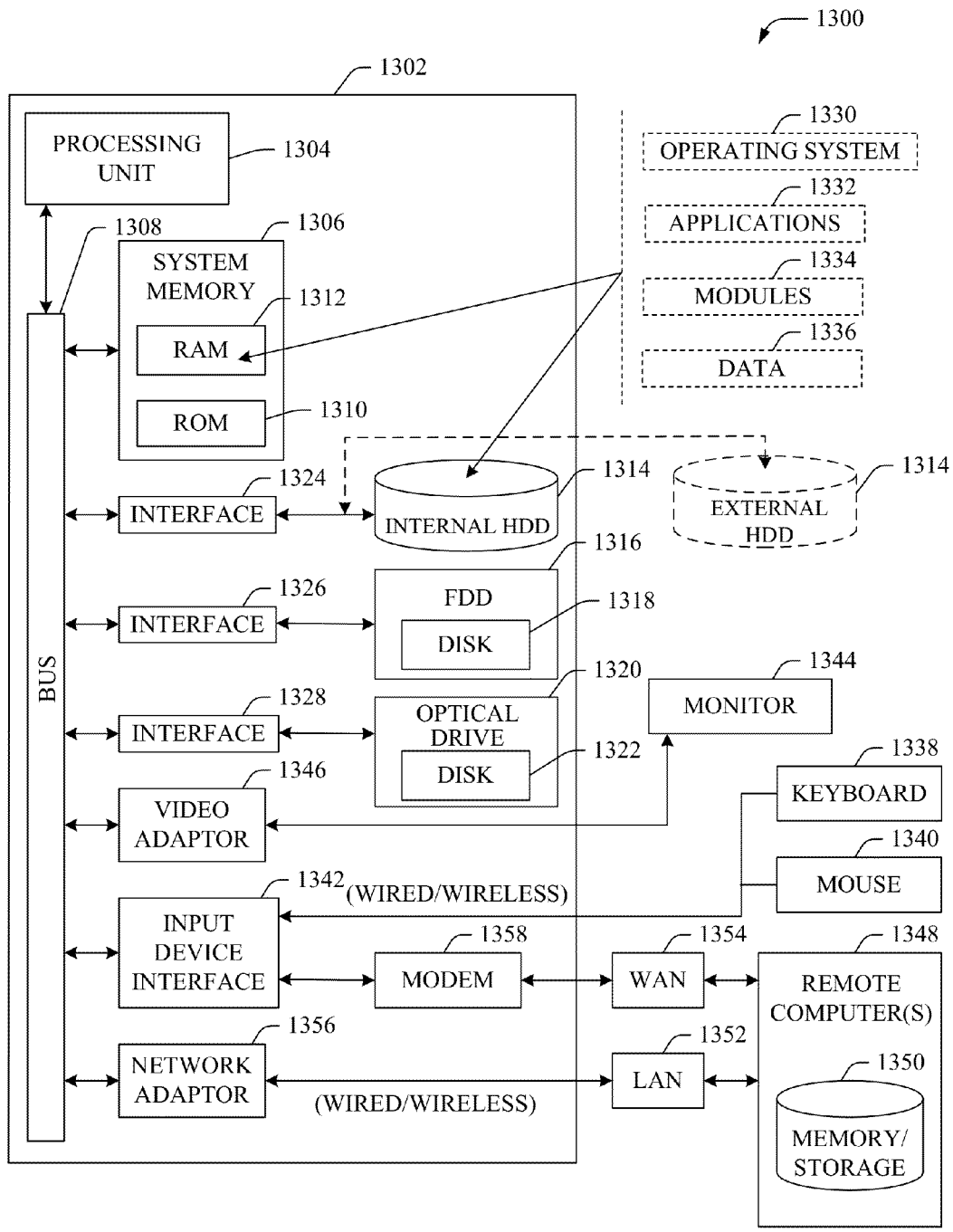
FIG. 13 illustrates a block diagram of a computer operable to execute the disclosed communication architecture.

Referring now to FIG. 13, there is illustrated a block diagram of a computer operable to execute the disclosed communication architecture. In order to provide additional context for various aspects of the subject specification, FIG. 13 and the following discussion are intended to provide a brief, general description of a suitable computing environment 1300 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 13, the example environment 1300 for implementing various aspects of the specification includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a nonvolatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 can also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the specification can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) can include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 can operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 is connected to the local network 1352 through a wired and/or wireless communication network interface or adapter 1356. The adapter 1356 can facilitate wired or wireless communication to the LAN 1352, which can also include a wireless access point disposed thereon for communicating with the wireless adapter 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are example and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
   a memory that stores computer-executable instructions; and
   a processor, communicatively coupled to the memory, that facilitates execution of the computer-executable instructions to at least:
      determine a measured amount of an interference signal that is to be transmitted by a femto access point device based on a predefined jamming criterion that facilitates jamming of a macro signal transmitted by a macro access point device, and
      facilitate a transmission of the measured amount of the interference signal, wherein the measured amount of the interference signal being determined triggers a carrier frequency scan at a user equipment communicatively coupled to the macro access point device.

2. The system of claim 1, wherein the measured amount of the interference signal is determined based on a degradation criterion associated with a communication session between the user equipment and the macro access point device.

3. The system of claim 2, wherein the measured amount of the interference signal does not degrade a signal quality associated with the communication session below a predefined quality threshold.

4. The system of claim 1, wherein the processor further facilitates the execution of the computer-executable instructions to scan a radio environment associated with the femto access point device.

5. The system of claim 4, wherein the processor further facilitates the execution of the computer-executable instructions to determine, based on the scan, that a signal quality of the macro signal satisfies a predefined signal quality criterion.

6. The system of claim 1, wherein the processor further facilitates the execution of the computer-executable instructions to determine a transmission power of the interference signal that facilitates the jamming of the macro signal.

7. The system of claim 1, wherein the processor further facilitates the execution of the computer-executable instructions to determine a time period during which the measured amount of the interference signal is to be transmitted.

8. The system of claim 7, wherein the time period is determined based on a number of user equipments within a femtocell coverage area associated with the femto access point device.

9. The system of claim 1, wherein the processor further facilitates the execution of the computer-executable instructions to facilitate a periodic switch between a first transmission on a femto frequency and a second transmission on a macro frequency to generate the measured amount of the interference signal.

10. The system of claim 1, wherein the processor further facilitates the execution of the computer-executable instructions to determine a ramp period, wherein the femto access point device gradually increases transmission power of the interference signal from an interference level to a maximum power level during the ramp period.

11. The system of claim 1, wherein the measured amount of the interference signal is transmitted in response to the femto access point device being in an idle mode of operation, wherein, during the idle mode of operation, a number of wireless devices coupled to the femto access point device satisfies a predefined idle mode criterion.

12. A method, comprising:
    determining, by a system comprising a processor, that a macro signal quality of a macro signal transmitted by a macro access point device satisfies a quality threshold; and
    facilitating, by the system, a decrease in the macro signal quality that triggers a carrier frequency scan at a user equipment coupled to the macro access point device, wherein the facilitating includes facilitating a transmission of a measured amount of an interference signal by a femto access point device based on a predefined jamming criterion.

13. The method of claim 12, further comprising:
    determining, by the system, a time period during which the measured amount of the interference signal is transmitted.

14. The method of claim 12, further comprising:
    determining, by the system, a duty cycle associated with the interference signal.

15. The method of claim 12, further comprising:
    identifying, by the system, that the user equipment has coupled to the femto access point device; and
    discontinuing, by the system, the transmission of the measured amount of the interference signal in response to the identifying.

16. The method of claim 12, wherein the determining includes comparing the macro signal quality with a scan trigger level associated with the user equipment.

17. The method of claim 12, wherein the facilitating the transmission of the measured amount of the interference signal includes periodically switching between a first transmission on a femto frequency and a second transmission on a macro frequency.

18. A non-transitory computer-readable storage medium having instructions stored thereon that, in response to execution, cause a system comprising a processor to perform operations, comprising:
    determining that a macro signal quality of a macro signal transmitted by a macro access point device satisfies a quality threshold; and
    facilitating a transmission of a measured amount of the interference signal by a femto access point device, wherein the measured amount of the interference signal triggers a carrier frequency scan in response to receipt at a user equipment communicatively coupled to the macro access point device.

19. The non-transitory computer-readable storage medium of claim 18, wherein the operations further comprise:
    determining the measured amount of the interference signal based on a predefined macro signal jamming criterion.

20. The non-transitory computer-readable storage medium of claim 18, wherein the operations further comprise:
   determining a time period for which the measured amount of the interference signal is to be transmitted.

* * * * *